INVENTOR.
ROBERT J. PLOW
BY
Willis L. Vary

INVENTOR.
ROBERT J. PLOW
BY
Willis L. Vary

June 25, 1968 — R. J. PLOW — 3,390,321
POLY-PHASE REGULATED RECTIFIER
Filed May 14, 1964 — 3 Sheets-Sheet 3

INVENTOR.
ROBERT J. PLOW
BY
Willis L. Very

United States Patent Office 3,390,321
Patented June 25, 1968

3,390,321
POLY-PHASE REGULATED RECTIFIER
Robert John Plow, Avon Lake, Ohio, assignor to Lorain Products Corporation, Avon Lake, Ohio, a corporation of Ohio
Continuation-in-part of application Ser. No. 351,505, Mar. 12, 1964. This application May 14, 1964, Ser. No. 367,507
18 Claims. (Cl. 321—5)

ABSTRACT OF THE DISCLOSURE

This invention is an improved poly-phase rectifier system provided with a group of input controlled rectifiers, output rectifiers, transformer means between the controlled and output rectifiers, and a regulating system for controlling the controlled rectifiers to compensate for variations in the load connected to the output rectifiers. The regulating portion of the system includes a reference amplifier coupled to the output, or the power rectifiers to compare a signal derived from the power rectifiers with a predetermined, fixed potential and to deliver an output signal indicative of the difference of this comparison. The difference signal is employed to control a variable phase-shift network which receives alternating current from the power input terminals and shifts the phase of this input power signal in accordance with the difference signal derived from the reference amplifier. The output of the variable phase-shift network is employed to gate or trigger a group of squarewave pulse generators which in turn deliver gating signals to the controlled rectifiers to thereby selectively control the input power delivered through the controlled rectifiers to the load.

---

This invention relates to poly-phase rectifiers and, more particularly, to an improved poly-phase rectifier system employing controlled unilateral impedances. This application is a continuation-in-part of joint application, Ser. No. 351,505 filed in the names of Richard G. Magner and Robert J. Plow on Mar. 12, 1964 for Poly-Phase Converter.

Poly-phase converters employing controlled unilateral impedances such as thyratrons and semi-conductor rectifiers are well known in the art. The more recent of these systems generally employs solid state devices such as silicon controlled rectifiers in the output circuit of a poly-phase power transformer to control the magnitude of unilateral impedance in series with the direct current load and thus regulate the power delivered to the load. These systems, however, exhibit numerous disadvantages. For example, the controlled rectifiers must have a relatively high current rating if they are serially connected in the load circuit and therefore are relatively expensive. Further, this problem is not simply solved by connecting the controlled rectifiers in series with the primary winding of the power transformer, i.e., in the low current section of the converter because this arrangement introduces new problems. For example, complicated control circuits are required accurately to control the conduction of the controlled rectifiers because of the problems of synchronizing the firing, or conduction, of the controlled rectifiers with the input waves and, further, because of the critical requirement of accuracy of placement of the firing pulse on the respective gates of the controlled rectifiers. Also, many of these systems do not include provision for automatically varying the output power for variations in the load.

Accordingly, it is an object of this invention to provide an improved poly-phase rectifier system.

Another object of this invention is to provide a poly-phase rectifier system employing solid state devices and saturable core reactors.

A further object of this invention is to provide an improved firing circuit for a controlled rectifier.

Another object of this invention is to provide a simplified control system for generating a control pulse with a controllable phase shift relative to an alternating current input signal.

Still another object of this invention is to provide an improved poly-phase rectifier system which is inherently synchronized with the input power and which employs a relatively few components to achieve a high degree of regulation.

A still further object of this invention is to provide a simplified poly-phase rectifier system which is inherently synchronized and employs a relatively simple variable phase shift circuit which responds to variations in output load to vary the phase of pulses derived from the input power and employs the phase shifted pulses to gate, or fire, serially connected, silicon controlled rectifiers in the input winding of the power transformer.

Yet another object of this invention is to provide, in a poly-phase rectifier system, a variable phase shift network, a squarewave pulse generator driven by pulses derived by the variable phase shift network and a clamping circuit for accurately controlling or limiting the amount of phase shift in the phase shift network.

Briefly, in according with aspects of this invention, I have discovered that an improved poly-phase rectifier system, such as a three-phase rectifier system, can be provided with a group of controlled rectifiers, a power transformer having an input winding for each phase, or a group of transformers, one for each phase, each rectifier connected in series with one of the input windings and one of the three-phase power input terminals, a number of power rectifiers connected to the output windings of the power transformer for rectifying the alternating current to direct current, an output filter connected to the power rectifiers, a reference amplifier connected across the output filter to derive a reference signal therefrom, a variable phase shift network coupled to the reference amplifier and to the power input terminals for delivering signals shifted in a phase in accordance with a signal derived from the output filter, a squarewave pulse generator coupled to the output of the phase shift network for developing a squarewave pulse in accordance with signals delivered by the variable phase shift network and a feedback circuit coupled between the variable phase shift network and the squarewave pulse generator for limiting the amount of phase shift, the squarewave pulse generator delivering accurately synchronized firing signals to the serially connected controlled rectifiers to control the output pulse width and thus control the power delivered to the load.

In accordance with more specific aspects of one embodiment of this invention, each controlled rectifier firing circuit comprises a variable phase shift network including a serially connected, saturable reactor controlled winding, a resistor and a parallel circuit including a resistor and a capacitor and this network is coupled to the source of input power. The control winding of the saturable reactor is coupled to the output of a differential amplifier, the input to the differential amplifier being coupled to the output filter. In one specific embodiment, the variable phase shift network is coupled to the input power terminals by means of a transformer primary winding, the secondary winding of which is connected to the previously mentioned series circuit of the controlled winding of the saturable reactor. Advantageously, a phase shifted output signal is taken from the point intermediate the saturable reactor controlled winding and the resistor and fed to an overdriven transistor which generates squarewave pulses. Also advantageously, a feedback path in the form of a clamping circuit, including a serially connected diode and resistor connected between the phase shift network and the pulse generator, clamps the output squarewave pulses to prevent the squarewave pulses from being shifted in phase more than 180° relative to the input alternating current. Because these squarewave pulses are applied between the gate and cathode electrodes of a respective controlled rectifier, these pulses should not exceed a delay of 180° after the sine wave from which they are derived, in order to keep the gate power dissipation to a minimum. This novel combination of variable inductance, resistance and capacitance phase shift network is capable of shifting the phase of the output signal relative to the input signal over a range of the order of plus 180° to minus 10°.

In accordance with rectifier another embodiment of this invention, I provide a simplified system which includes a phase shift network employing a saturable reactor having a bias winding, a control winding and a controlled winding. One terminal of the controlled winding is connected by a series resistance to an alternating current input means. The other terminal of the controlled winding is connected to the input of an overdriven transistor squarewave generator. The output of the transistor squarewave generator is coupled through a feedback path including a rectifier to the point intermediate the resistor and the controlled winding of the saturable reactor. The transistor squarewave generator comprises a single transistor having at least three electrodes with the base electrode connected to the controlled winding, the collector electrode connected to the feedback path and the emitter electrode connected to the alternating current input means. The transistor is provided with a capacitor coupled between the collector and base electrodes to prevent high frequency oscillations. Preferably, the firing circuit is provided with a second input winding to which is coupled a diode and a capacitor for developing a direct current bias for the transistor and the saturable reactor bias winding.

In accordance with other aspects of this embodiment, I provide a preamplifier coupled by means of a differential amplifier to the output of the converter, which preamplifier is coupled to the control winding of the saturable reactor. This preamplifier includes a transistor having its base electrode coupled to the collector electrode of one of the transistors of the differential amplifier and having its emitter electrode coupled through a rectifier to the output terminal of the converter. Preferably, this preamplifier is provided with a loop equalization network, such as a serially connected resistor and capacitor, which is coupled between the emitter and base electrodes of the preamplifier transistor. The collector electrode is connected to one of the terminals of the control winding of the saturable reactor. The other terminal of the control winding of the saturable reactor is connected to a voltage divider network which is connected across the output terminals of the converter. A corresponding phase shifting and pulse generating circuit is provided for each controlled rectifier in each input phase of the converter. It is, of course, understood that this combination of phase shifting and pulse generating circuit may be employed in any application in which it is desired to fire, or gate, a controlled rectifier or in any application in which it is desired to develop a controllable output pulse which may be regulated in phase relative to the input alternating current.

These and various other objects and features of the invention will be more clearly understood from a reading of the detailed description of the invention in conjunction with the drawing which shows a preferred embodiment of the invention in which.

Figure 1:
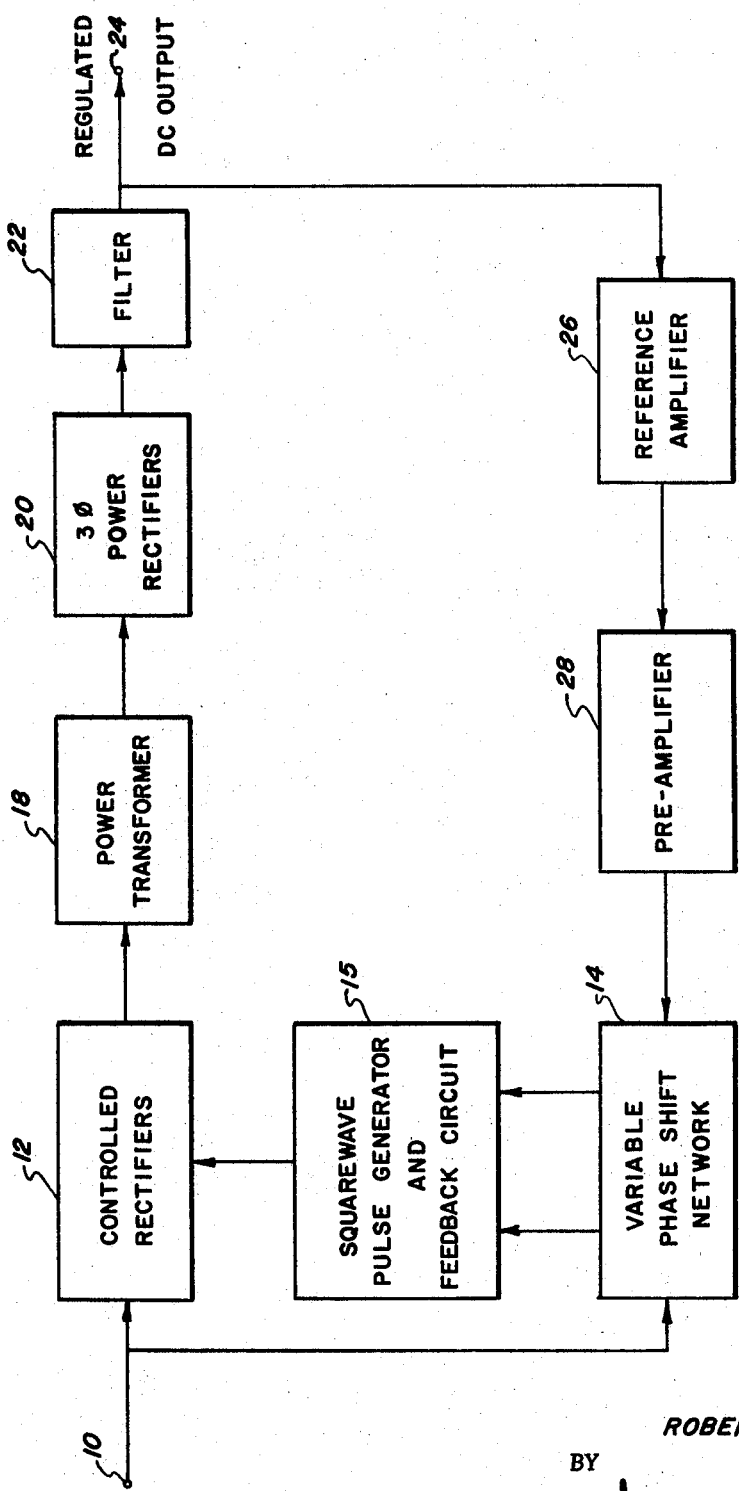
FIGURE 1 is a block diagram of one illustrative embodiment of poly-phase converter according to this invention.

Referring to FIGURE 1, there is shown in block form one illustrative embodiment of this invention in which a three-phase input is fed from an input 10 to a group of controlled rectifiers 12 including at least one controlled rectifier for each phase. This three-phase input is also fed to a variable phase shift network 14. The variable phase shift network 14 develops a signal which is shifted in phase relative to the input sine wave and delivers this signal to a group of squarewave generators and feedback circuits 15. The squarewave generators and feedback circuits 15 are each coupled to deliver firing signals to one of the group of controlled rectifiers 12. The output of the controlled rectifiers is fed to the input windings of a power transformer means 18 which may be a polyphase transformer or a group of single-phase transformers connected in a poly-phase network. The output windings of the power transformer are connected to a group of three-phase power rectifiers 20 which delivers a direct current output to a filter 22. The output of the filter 22 is fed as a regulated direct current output to output terminals 24. The output of filter 22 is also fed to a reference amplifier 26 which compares the feedback signal which indicates the load potential at terminal 24 with a constant reference potential and delivers an output signal through a preamplifier 28 to the variable phase shift network 14. This compared signal, fed from the reference amplifier 26 through preamplifier 28, is actually connected to control the amount of phase shift produced in the variable phase shift network 14.

Figure 2:
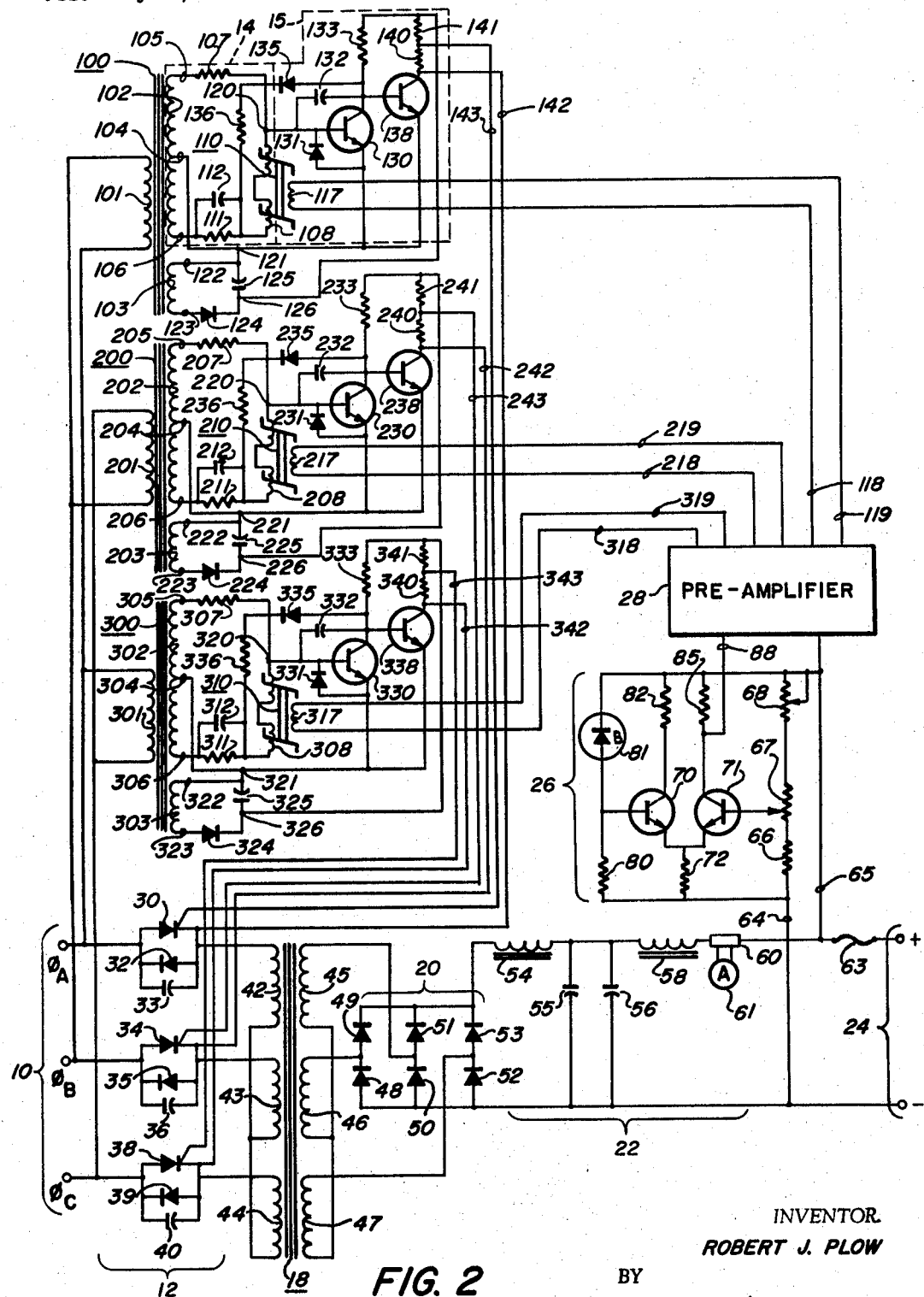
FIGURE 2 is a schematic representation of one embodiment of the invention.

FIGURE 2 depicts in schematic form one embodiment of the invention. The three-phase input 10 includes three terminals, each connected to one of the respective phases of the conventional three-phase line. Each of these terminals is connected to a controlled rectifier network including a controlled rectifier, a reverse connected diode and a capacitor, all connected in parallel. The first network includes a controlled rectifier 30, a reverse connected diode 32 and a capacitor 33. The second network includes a rectifier 34, a reverse connected diode 35 and a capacitor 36. The third network includes a controlled rectifier 38, a reverse connected diode 39 and a capacitor 40. The controlled rectifiers each include a cathode, an anode and a gate electrode and may preferably be of the type known as silicon controlled rectifiers which may be selectively rendered conducting by the application of a firing pulse between the gate and cathode electrodes at the time a potential is applied between the cathode and anode such that the anode is positive relative to the cathode. The reverse connected diodes 32, 35 and 39 provide return paths for the polyphase current while the capacitors 33, 36 and 40 bypass high frequency noise on the transmission line.

The power transformer 18 has a group of three input windings 42, 43 and 44 which are wye connected and are connected to the controlled rectifiers 30, 34 and 38, respectively. Transformer 18 includes three wye connected output windings 45, 46 and 47 and these output windings are connected to a group of power rectifiers 20, which group includes rectifiers 48, 49, 50, 51, 52 and 53, all connected for three-phase rectification in a manner well known in the art. The output of power rectifiers 20 is fed to a filter circuit 22 which includes a first serially connected inductance 54, a pair of shunt connected capacitors 55, 56, and a second serially connected inductance 58, the output of which is connected to a pair of output terminals 24 through the shunt 60 of an ammeter 61 and a fuse 63. It is understood that any other well known type of filter arrangement might be substituted for this filter.

The output potential at terminals 24 is accurately controlled in accordance with the varying load conditions through a feedback network which controls the firing of the controlled rectifiers 30, 34 and 38 to thereby control the pulse width of the pulses applied to input windings 42, 43 and 44 in a manner which will be subsequently described. The feedback path includes the reference amplifier 26 which, in this particular instance, is a voltage difference amplifier having its input terminals connected across the output of the filter 22.

Difference amplifier 26 has a pair of busses 64, 65 connected to the output terminals 24 of the filter 22. A voltage divider network including serially connected resistors 66, 67 and 68 is connected between busses 64, 65. Resistors 67, 68 are variable to vary the amount of signal from the output terminals being applied to the difference amplifier 26. Preferably, resistor 68 is relatively large to produce coarse regulation of the required potential while resistor 67 is relatively small. For example, resistor 67 may have a resistance of only one-tenth as large as the resistance of resistor 68 to provide a fine adjustment for the potential being applied to the comparison portion of the difference amplifier. The comparison portion of difference amplifier 26 includes a pair of transistors 70, 71 connected in a common emitter configuration to a common emitter bias resistor 72, which resistor is connected to the reference amplifier input bus 64. The base of transistor 71 is connected to the variable tap of resistor 67. The base of transistor 70 is connected through a resistor 80 to the terminal of resistor 72 remote from the emitter electrodes of the transistors 70, 71. A Zener diode 81 is connected between reference amplifier bus 65 and the base of transistor 70 to maintain the potential between the bus 65 and base electrodes of the transistor 70 at a constant reference value. System bus 65 is connected through a resistor 82 to the collector electrode of transistor 70. A resistor 85 is connected between bus 65 and the collector electrode of transistor 71. The output of reference amplifier 26, which is a signal indicating a comparison of the potential across that portion of the voltage divider 66, 67 and 68 between bus 65 and the base of transistor 71 with that across Zener diode 81, is applied across a system bus 88 connected to the collector electrode of transistor 71 and bus 65.

This signal is fed through a preamplifier 28, previously mentioned in connection with FIGURE 1, where it is amplified and fed to a variable phase shift network 14. The variable phase shift network 14 includes three identical variable phase shift circuits, one for each phase, and the squarewave generators and feedback circuits 15 include a pulse generator and a clamping type feedback circuit for each variable phase shift circuit. Only one combination of variable phase shift circuit, pulse generator and clamping circuit will be described in detail. The remaining two circuits are designated with corresponding numbers for corresponding parts except prefixed by the numbers 200 and 300.

This combination of variable phase shift network, squarewave pulse generator and clamping circuit includes a transformer 100 having a primary winding 101 coupled between the A and B phases of the input 10, a first output winding 102 and a second output winding 103. The output winding 102 has a center tap 104 and a pair of output terminals 105, 106. A series-parallel network including a resistor 107, a controlled winding 108 of a saturable reactor 110, a resistor 111 and a capacitor 112 connected in parallel with the resistor 111 is serially connected betwen output terminals 105, 106. The saturable core reactor 110 includes a control winding 117 connected to a pair of output terminals 118, 119 of preamplifier 28. The alternating current input power applied to the primary winding 101 of transformer 100 induces a current in the output winding 102 which is applied to the phase shifting circuit including resistor 107, the winding 108 of saturable core reactor 110, resistor 111 and capacitor 112 and this current will be shifted in phase in accordance with the signal applied from preamplifier 28 through its output terminals 118, 119 to the control winding 117 of the saturable core reactor 110. This signal which is shifted in phase relative to the sine wave three-phase input power is applied through a pair of busses 120, 121 to a pulse generating circuit for generating squarewave pulses. The bus 121 is connected to the center tap 104 of the output winding 102 of transformer 100. The bus 121 is also connected to a terminal 122 of the output winding 103 of transformer 100. The winding 103 has a second output terminal 123 which is connected through a diode 124 to one terminal of a capacitor 125, the other terminal of capacitor 125 being connected to bus 121 and terminal 122. Winding 103, diode 124 and capacitor 125 act as a power source to supply direct current for the pulse generator circuit which will be subsequently described. This direct current output is fed through bus 121 and a bus 126. Saturable reactor phase-shifting networks are known in the art. One example of this type of network is disclosed on pp. 4–47 of Industrial Electronics Handbook, first edition, by William D. Cockrell, a McGraw-Hill publication (1958).

The squarewave pulse generator includes a transistor 130 having its base electrode connected to the bus 120 and its emitter electrode connected to the bus 121. A diode 131 is connected between the emitter and base electrodes of transistor 130 to prevent excessive reverse voltage on the base-emitter junction of transistor 130. A capacitor 132 is connected between the collector and base electrodes of the transistor 130 to act as a filter for the output from the collector of transistor 130. A resistor 133 connects the bus 126 to the collector electrode of transistor 130 to apply a suitable bias to the transistor 130. Preferably, the resistor is of such a value that transistor 130 will be overdriven by the phase shifted input signals and will thus generate a squarewave output signal. Advantageously, a clamping type feedback circuit is provided for the pulse generator circuit which limits the duration of the pulse generated in relation to the phase shift of the signal applied to the pulse generator. This clamping circuit includes a diode 135 having its anode connected to the collector electrode of transistor 130 and a resistor 136 connected between the cathode of diode 135 and the terminal of winding 108 remote from bus 120. This clamping circuit prevents squarewave pulses generated in the overdriven transistor 130 from extending beyond 180° after the application of the respective sine wave signal across output terminals 105, 106 of transformer 100.

The squarewave output of overdriven transistor 130 is applied to the base electrode of a transistor 138, the emitter electrode of which is connected to the system bus 121. The collector electrode of transistor 138 is connected through a pair of serially connected resistors 140, 141 to the current supply bus 126 to provide a suitable bias. This transistor 138 amplifies the signal fed from transistor 130 and delivers this amplified signal across its output load, namely, the resistors 140, 141, and an output signal is taken from across resistor 140 and fed over a pair of busses 142, 143 to the cathode and gate electrodes, respectively, of the silicon controlled rectifier 30.

The portion of the variable phase shift network 14 which includes transformer 200, the pulse generator circuit including transistor 230 and the clamping circuit including diode 235 is employed to deliver firing pulses to the gate and cathode electrodes of silicon controlled rectifier 34. Similarly, the portion of the variable phase shift network including transformer 300 and the clamping circuit including diode 335 is employed to deliver gating pulses between the gate and cathode electrodes of silicon controlled rectifier 38.

This arrangement of phase shift network employing a resistor 107, the saturable reactor 110 and the parallel network of resistor 111 and capacitor 112 is capable of shifting the phase of the signal applied across terminals 105, 106 over a range of angles of the order of plus 180° to minus 10° relative to the alternating current input. The ability of the control system to shift the output signal over a range greater than 180° provides the capability of obtaining high values of power factor, i.e., within one or two percent of maximum theoretical power factor. Because of the operation of the clamping circuit type feedback path including diode 135 and resistor 136, the phase shift cannot exceed 180° so that the gate power dissipation is kept to a minimum. By applying the output of the differential amplifier 26 to control winding 117 of the saturable core reactor 110, the amount of phase shift of pulses generated by the squarewave generator including transistor 130 and the amount of phase shift of the output pulses fed by transistor 138 to the gate and cathode electrodes of controlled rectifier 30 are controlled in accordance with the direct current output to the terminals 24. Because the operation of each of the phase shift controlling saturable reactors 110, 210 and 310, their associated pulse generators including transistors 130, 230 and 330, and their clamping circuits including diodes 135, 235 and 335 is identical, variations in the output at terminals 24 control the duration of the output pulses of controlled rectifiers 30, 34 and 38.

Figure 3:
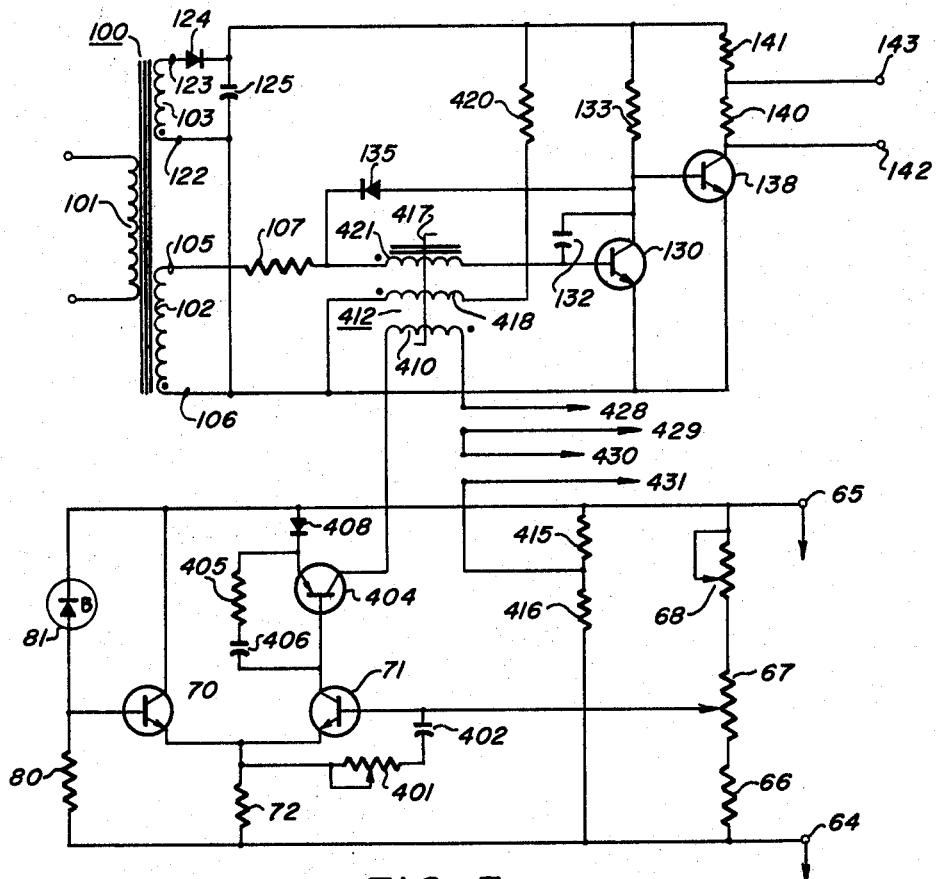
FIGURE 3 is a schematic representation of portions of another illustrative embodiment of this invention.

FIGURE 3 is a schematic representation of a reference amplifier, a preamplifier, a variable phase shift circuit and a squarewave pulse generator and clamping type feedback circuit. The amplifier and preamplifier may be substituted for the structure depicted in block form as blocks 26 and 28. The combination of variable phase shift circuit-squarewave generator and clamping type feedback circuit may be one of three similar combinations contained in blocks 14 and 15, of FIGURE 1, all of this schematic representation being substituted in the embodiment of FIGURE 2. FIGURES 4A through 4D are time plots of waveforms illustrating the principles of operation of the embodiment of FIGURE 3. In FIGURE 3, the voltage divider, including resistors 66, 67 and 68, is connected between busses 64, 65 from filter 22 as shown in FIGURE 2. Resistor 68 constitutes the coarse voltage adjustment and resistor 67 constitutes the fine voltage adjustment for the difference amplifier which includes transistors 70, 71 and the Zener diode 81. In this embodiment, the Zener diode 81 is coupled directly between the collector and base electrodes of the transistor 70. One terminal of resistor 72 is connected to the emitter electrodes of transistors 70, 71. The resistor 80 is connected between the base electrode of transistor 70 and the other terminal of resistor 72. In this particular embodiment, the difference amplifier includes a loop equalization network in the form of a variable resistor 401 and a capacitor 402 serially connected between emitter and base electrodes of transistor 71. The output of the difference amplifier is fed directly from the collector electrode of transistor 71 to the base elecrode of a preamplifier transistor 404. The transistor 404 and its associated components constitute the preamplifier 28. A second loop equalizing network in the form of a serially connected resistor 405 and a capacitor 406 is connected between the emitter and base electrodes of the preamplifier transistor 404. The emitter electrode of transistor 404 is connected by means of a diode 408 to the bus 65. The collector electrode of the preamplifier transistor 404 is connected directly to one terminal of a control winding 410 of a saturable reactor 412. The opposite terminal of the control winding 410 is serially connected to the control windings of two other saturable reactors as will be subsequently described.

Also in this embodiment, the individual firing circuits for the controlled rectifiers 12 include a phase shift network employing a saturable reactor with a biasing winding. This firing circuit includes a number of the parts employed in the embodiment of FIGURE 2 and the parts perform the same function in this embodiment as in the embodiment of FIGURE 2. This embodiment of firing circuit, however, is considerably simplified with respect to the embodiment of FIGURE 2 because only a single magnetic core is employed as compared to the pair of magnetic cores for each of the phase shift circuits of the embodiment of FIGURE 2. Further, the parallel network including capacitor 112 and resistor 111 in the embodiment of FIGURE 2 has been eliminated in the embodiment of FIGURE 3.

In the embodiment of FIGURE 3, the saturable reactor 412 includes a single square loop type core indicated by a "Z" shaped symbol 417. This core is preferably a high nickel alloy and may be of the type designated "Super-Mu 30" and sold by Magnetics, Incorporated. The saturable reactor 412 includes a bias winding 418 which has one terminal connected to the output terminal 106 of winding 102 and the other terminal is connected through a resistor 420 to the cathode of diode 124. Thus, the bias winding 418 is biased by the bias supply including diode 124 and capacitor 125. In this particular instance, the bias may be of the order of ten volts under no load conditions. The saturable reactor 412 includes a controlled winding 421 which is serially connected between the resistor 107 and the base electrode of the transistor 130. The saturable reactor 412 is quite small in comparison to the saturable reactors 110, 210 and 310 in the embodiment of FIGURE 2. For example, the cost of the saturable reactor 412 is between one-third and one-half of the cost of the saturable reactors 110, 210 and 310 of the embodiment of FIGURE 2, the systems being designed to provide the same squarewave firing pulses to the respective silicon controlled rectifiers. The transistor squarewave generator includes the transistor 130 and a feedback path defining diode 135 is provided between the collector electrode of this transistor and a point intermediate resistor 107 and winding 421. The output of the squarewave generator transistor 130 is applied to the base electrode of the transistor 138 and the collector of the transistor 138 is connected to a voltage divider including resistors 140, 141. The output of transistor 138 is taken across the resistor 140 and this output is fed over busses 142, 143 to the cathode and gate electrodes, respectively, of the rectifier 30, in the same manner as in FIGURE 2. It is understood that a corresponding firing circuit in the form of a combination of variable phase shift network, pulse generator and feedback circuit will be coupled between the preamplifier transistor 404 and each of controlled rectifiers 34, 38. The connections to the control windings of the saturable reactors of these firing circuits are indicated at terminals 428, 429 and 430, 431, respectively.

Figure 4A:
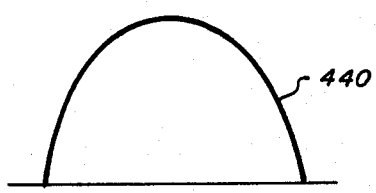
FIGURES 4A through 4D are time plots of wave shapes illustrating the principles of operation of the embodiment of FIGURE 3.
Figure 4B:
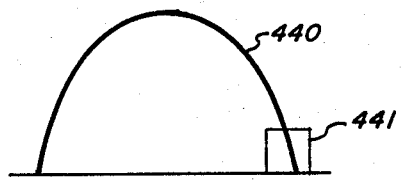
Figure 4C:
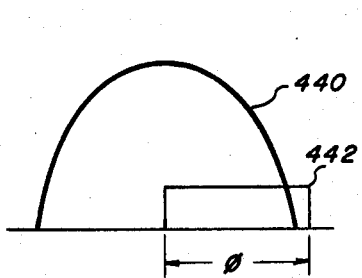
Figure 4D:
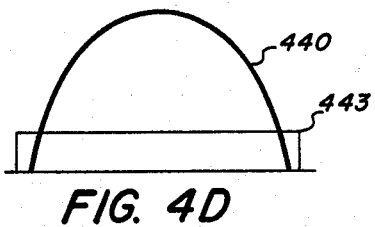

The operation of the embodiment including the portions shown in FIGURE 3 will now be described in conjunction with FIGURES 4A through 4D. FIGURE 4A is a time plot of a half cycle 440 of the reference alternating current applied to winding 101 when no control current is being applied to the control winding 410 of the saturable reactor 412. Because of the bias on winding 412, no signal is applied to transistor 130 and no output is delivered to resistor 140. FIGURE 4B is a time plot of the reference alternating current halfwave 440 and illustrates a relatively small gate voltage 441 being applied from the output terminals 142, 143 as a result of a relatively small control current being supplied to the control winding 410 of the saturable reactor 412. FIGURE 4C illustrates a gate voltage 442 which is of a duration approximately half the reference alternating current halfwave 440, which duration is achieved by the application of approximately one-half of the maximum control current to the control winding 410. In FIGURE 4D, full control current of the order of 65 milliamperes is fed to winding 410 and amplifier 138 produces a gate voltage 443 of duration slightly longer than the halfwave alternating current 440. This control current is fed over the output busses 142, 143 over the entire half cycle of the input wave 440 to thus insure full control of the controlled rectifier 30. An identical operation, displaced 120 electrical degrees, takes place in each of the circuits, not shown but previously described, and connected to terminals 428, 429 and 430, 431.

While I have shown and described two illustrative embodiments of this invention, it is understood that the concepts thereof could be applied to other embodiments without departing from the spirit and scope of this invention.

What is claimed is:

1. In a poly-phase rectifier system, the combination comprising:
   poly-phase power input means;
   controlled rectifier means connected to said input means;
   transformer means including a plurality of input windings and a plurality of output windings, said controlled rectifier means being coupled between said power input means and said input windings;
   output rectifier means coupled to said output windings;
   voltage difference means coupled to said output means for comparing the potential of said output rectifier means to a reference potential and delivering an output signal indicative of the difference of this comparison;
   a plurality of phase shift means, each coupled to said input means and to said voltage difference means to receive said ouput signal; and
   pulse generator means coupled between one of said phase shift means and one of said controlled recifier means for controlling the firing of said one controlled rectifier means.

2. In a poly-phase rectifier system, the combination comprising:
   poly-phase power input means;
   transformer means including a plurality of interconnected input windings and a plurality of inter-connected output windings;
   semi-conductor means coupled between said power input means and said input windings and including a plurality of control electrodes;
   rectifier means coupled to said output windings;
   voltage difference means for comparing the potential of said rectifier means to a reference potential coupled to the output of said rectifier means;
   phase shift means coupled to said power input means and to said voltage difference means; and
   pulse generator means coupled to said phase shift means and to said control electrodes for controlling the conduction of said semi-conductor means.

3. In a poly-phase rectifier system, the combination comprising:
   poly-phase power input means;
   transformer means including a plurality of inter-connected input windings and a plurality of inter-connected output windings;
   semi-conductor means coupled betwen said power input means and said input windings and including a plurality of control electrodes;
   output rectifier means coupled to said output windings; and
   control means connected to each of said control electrodes and including
      voltage difference means coupled to said output means for comparing the potential of said rectifier means to a reference potential and delivering an output signal indicative of the difference of this comparison,
      phase shift means connected to said power input means and to said voltage difference means, and
      pulse generator means coupled to said phase shift means and coupled to said control electrodes.

4. In a poly-phase rectifier system, the combination comprising:
   poly-phase power input means;
   transformer means including a plurality of inter-connected input windings and a plurality of inter-connected output windings;
   rectifier means connected to said output windings;
   variable pulse width control means coupled between said power input means and said input windings and including a plurality of control terminals; and
   second control means coupled between said power input means and said control terminals including
      voltage difference means coupled to said rectifier means for comparing the potential of said rectifier means to a reference potential and delivering an output signal indicative of the difference of this comparison,
      phase shift means coupled to said power input means and to said voltage difference means, and
      pulse generator means coupled to said phase shift means and to said control terminals.

5. In a poly-phase rectifier system, the combination comprising:
   poly-phase power input means;
   controlled rectifier means connected to said input means;
   transformer means including a plurality of input windings and a plurality of output windings, said controlled rectifier means being coupled between said power input means and said input windings;
   output rectifier means coupled to said output windings;
   voltage difference means coupled to said output rectifier means for comparing the potential of said output rectifier means to a reference potential and delivering an output signal indicative of the difference of this comparison;
   phase shift means coupled to said input means and to said voltage difference means;
   pulse generator means coupled between said phase shift means and each of said controlled rectifier means for controlling the firing of said controlled rectifier means; and
   clamping means coupled to said pulse generator means and to said phase shift means for limiting the range of phase shift of the pulses generated by said pulse generator means.

6. In a poly-phase rectifier system, the combination comprising:
   poly-phase power input means;
   transformer means including a plurality of interconnected input windings and a plurality of inter-connected output windings;
   semi-conductor means coupled between said power input means and said input windings and including a plurality of control electrodes;
   rectifier means coupled to said output windings;
   voltage difference means coupled to the output of said rectifier means for comparing the potential at said rectifier means to a reference potential and delivering output signal indicative of the difference of this comparison;
   phase shift means coupled to said power input means and to said voltage difference means;
   pulse generator means coupled to said phase shift means and to said control electrodes for controlling the conduction of said semi-conductor means; and
   phase shift limiting means for limiting the extent of phase shift between the pulses generated by said pulse generator means and the input signal to said phase shift means from said input means.

7. In a poly-phase rectifier system, the combination comprising:
   poly-phase power input means;
   transformer means including a plurality of interconnected input windings and a plurality of interconnected output windings;
   semi-conductor means coupled between said power input means and said input windings and including a plurality of control electrodes;
output rectifier means coupled to said output windings; and
control means coupled to each of said control electrodes and including
voltage difference means coupled to said output means,
phase shift means coupled to said power input means and to said voltage difference means,
pulse generator means coupled to said phase shift means and coupled to said control electrodes, and
clamping means coupled to said pulse generator means and to said phase shift means for limiting the amount of phase shift of the pulses generated by said pulse generator means relative to the input from said polyphase power input means.

8. In a poly-phase rectifier system, the combination comprising:
poly-phase power input means;
transformer means including a plurality of interconnected input windings and a plurality of interconnected output windings;
output rectifier means coupled to said output windings;
variable pulse width control means coupled between said power input means and said input windings and including a plurality of control terminals; and
second control means coupled between said power input means and said control terminals and including
voltage difference means coupled to said output means, for comparing the potential at said output rectifier means to a reference potential and delivering an output signal indicative of the difference of this comparison,
phase shift means coupled to said power input means and coupled to said voltage difference means,
pulse generator means coupled to said phase shift means and to said cotnrol terminals, and
clamping means coupled between said phase shift means and said pulse generator means for preventing the duration of pulses generated by said pulse generator means from being delayed more than 180° after the input signal to said phase shift means.

9. In a poly-phase rectifier system, the combination comprising:
power input means;
controlled rectifier means connected to said input means;
transformer means including a plurality of input windings and a plurality of output windings, said controlled rectifier means being coupled between said power input means and said input windings;
output rectifier means coupled to said output windings;
voltage difference means coupled to said output means for comparing the potential of said output rectifier means to a reference potential and delivering an output signal indicative of the difference of this comparison;
variable phase shift means coupled to said input means and to said voltage difference means and including a saturable reactor having a controlled winding and a control winding, said controlled winding being coupled to said input means, said control winding being coupled to said voltage difference means;
pulse generator means coupled between said controlled winding and one of said controlled rectifier means for controlling the firing of said controlled rectifier means; and
clamping means coupled to said pulse generator means and to said controlled winding for limiting the phase shift of the pulses generated by said pulse generator means.

10. In a poly-phase rectifier system, the combination comprising:
power input means;
controlled rectifier means connected to said input means;
output rectifier means coupled to said rectifier means;
voltage difference means coupled to said output means for comparing the potential at said output rectifier means to a reference potential delivering an output signal indicative of the difference of this comparison;
phase shift means coupled to said input means and to said voltage difference means, said phase shift means including a saturable reactor having a controlled winding and a control winding coupled to said voltage difference means, said phase shift means further including resistance means serially connected between said controlled winding and said input means; and
pulse generator means coupled between said phase shift means and one of said controlled rectifier means for controlling the firing thereof.

11. In a poly-phase rectifier system employing controlled rectifier means each having a control electrode, the combination comprising:
power input means;
power output means;
phase shift means coupled to said power input means and including
a pair of input terminals,
a saturable reactor having a controlled winding coupled to one of said input terminals, and
resistance means coupling said controlled winding to the other of said input terminals, said saturable reactor including a control winding coupled to said output means;
pulse generator means coupled to the output of said phase shift means and to one of said control electrodes; and
clamping means including a diode connected between said pulse generator means and said phase shift means for limiting the duration of the pulses generated by the pulse generator means.

12. In a poly-phase rectifier system, the combination comprising:
power input means;
semi-conductor unilateral impedance means having control electrodes and coupled to said power input means;
output means coupled to said impedance means;
phase shift means coupled to said power input means and including
a pair of input terminals,
a saturable reactor having a control winding and a controlled winding,
a parallel resistor and capacitor coupling one terminal of said controlled winding to one of said pair of terminals, and
resistance means coupling the other terminal of said controlled winding to the other of said pair of input terminals;
pulse generator means coupled between said phase shift means and one of said control electrodes; and
clamping means including a diode connected between said pulse generator means and said parallel network.

13. In a control system, the combination comprising:
a pair of input terminals;
phase shift means coupled to said input terminals and including a resistance means and a saturable reactor having a control winding and a controlled winding, said controlled winding being coupled to one of said input terminals by said resistance means;
pulse generator means having an input coupled between the controlled winding and said resistance means; and
feedback means including a diode coupled to the output of said pulse generator and to said controlled winding whereby the application of a signal to said control winding controls the phase relationship between the pulse delivered from said pulse generator means relative to the signal applied to said input terminals.

14. In a rectifier system, the combination comprising:
a pair of input terminals;
a plurality of controlled rectifiers each having an electrode connected to one of said input terminals and an output electrode and a control electrode;
a saturable reactor having a control winding and a controlled winding;
a parallel circuit including a resistor and a capacitor coupling said controlled winding to one of said input terminals;
resistance means coupling said controlled winding to the other of said input terminals;
pulse generator means including a semi-conductor having its input coupled to said controlled winding;
means coupled to said pulse generator means for limiting the phase shift of the output signal from said pulse generator relative to the signal applied to said input terminals; and
means coupled to said control winding for controlling the phase shift of the output signal from said pulse generator means relative to the signal applied to said input terminals, said phase-shift means being coupled to said control electrodes.

15. In a control system, the combination comprising:
a pair of alternating current input terminals;
a saturable reactor having a control winding and a controlled winding;
means coupling said controlled winding to one of said input terminals and resistance means coupling the other of said input terminals to said controlled winding;
a squarewave pulse generator having its input coupled intermediate said controlled winding and said resistance means;
means coupled to said squarewave pulse generator for limiting the phase shift of the output pulse from said squarewave pulse generator relative to the alternating current applied to said input terminals; and
means coupled to said control winding for controlling the phase shift of the output pulses from said squarewave pulse generator relative to the signal applied to said input terminals.

16. In a control system, the combination comprising:
a pair of input terminals;
phase shift means coupled to said input terminals aand including a resistance means and a saturable reactor having a control winding and a controlled winding, said controlled winding being coupled to one of said input terminals by said resistance means;
pulse generator means having an input coupled to said controlled winding; and
feedback means including a diode coupled to the output of said pulse generator and to said controlled winding whereby the application of a signal to said control winding controls the phase relationship between the pulse delivered from said pulse generator means relative to the signal applied to said input terminals.

17. In a rectifier system, the combination comprising:
a pair of input terminals;
a saturable reactor having a control winding, a bias winding, and a controlled winding;
means for supplying a bias to said bais winding;
resistance means coupling said controlled winding to one of said input terminals;
pulse generator means including a semi-conductor having its input coupled to said controlled winding;
means coupled to said pulse generator means for limiting the phase shift of the output signal from said pulse generator relative to the signal applied to said input terminals; and
means coupled to said control winding for controlling the phase shift of the output signal from said pulse generator means relative to the signal applied to said input terminals.

18. In a control system, the combination comprising:
a pair of alternating current input terminals;
a saturable reactor having a control winding, a bias winding, and a controlled winding;
means for applying a bias to said bias winding;
means coupling said controlled winding to one of said input terminals;
a squarewave pulse generator having its input coupled to said controlled winding;
means coupled to said squarewave pulse generator for limiting the phase shift of the output pulse from said squarewave pulse generator relative to the alternating current applied to said input terminals; and
means coupled to said control winding for controlling the phase shift of the output pulses from said squarewave pulse generator relative to the signal applied to said input terminals.

References Cited

UNITED STATES PATENTS

| | | | |
|---|---|---|---|
| 3,114,098 | 12/1963 | Rallo et al. | 321—18 |
| 3,134,068 | 5/1964 | Feltman | 321—18 |
| 3,183,376 | 5/1965 | Boyer et al. | 307—103 |
| 3,193,753 | 7/1965 | Fleming | 321—18 |
| 3,273,043 | 9/1966 | Clarke et al. | 321—18 |
| 3,143,698 | 8/1964 | Rockafellow | 323—18 |

LEE T. HIX, *Primary Examiner.*

WARREN E. RAY, *Examiner.*

W. M. SHOOP, *Assistant Examiner.*